United States Patent [19]

March

[11] Patent Number: 5,121,940
[45] Date of Patent: Jun. 16, 1992

[54] COLLAPSIBLE INFANT SEAT CARRIER

[76] Inventor: Janet L. March, 515 32nd Ave. South, Nashville, Tenn. 37212

[21] Appl. No.: 694,305

[22] Filed: May 2, 1991

[51] Int. Cl.⁵ .............................................. B62B 7/06
[52] U.S. Cl. ....................................... 280/644; 280/649; 280/30; 280/47.38; 297/255
[58] Field of Search ................ 280/30, 31, 47.38, 650, 280/643, 644, 647, 648, 649; 297/250, 255, 377

[56] References Cited

U.S. PATENT DOCUMENTS

| | | | |
|---|---|---|---|
| 2,574,743 | 11/1951 | King | 280/47.38 X |
| 3,208,763 | 9/1965 | Boyd | 280/643 |
| 3,550,998 | 12/1970 | Boudreau et al. | 280/47.38 X |
| 3,997,213 | 12/1976 | Smith et al. | 280/30 X |
| 4,157,839 | 6/1979 | Lahti et al. | 280/644 X |
| 4,346,912 | 8/1982 | Habib | 280/644 |
| 4,369,986 | 1/1983 | de la Fe | 280/644 |
| 4,685,688 | 8/1987 | Edwards | 280/644 X |
| 4,768,795 | 9/1988 | Mar | 280/30 |
| 4,921,261 | 5/1990 | Sadler, Jr. et al. | 280/648 X |

Primary Examiner—Andres Kashnikow
Assistant Examiner—Brian L. Johnson
Attorney, Agent, or Firm—Longacre & White

[57] ABSTRACT

A collapsible stroller frame adapted to carry variously sized and shaped infant type seats. The frame includes a pair of longitudinal elements having handles at one end and wheels at the other. A strap connects between the longitudinal elements in a rearward portion of the erect frame. A sling element is positioned in a forward portion of the erect frame and is possibly supported by an additional support member connecting between the longitudinal elements. The sling accommodates the front portion of an infant seat and the strap supports the rear portion of the seat. The frame may also include additional strap elements to secure the seat to the frame.

8 Claims, 4 Drawing Sheets

COLLAPSIBLE INFANT SEAT CARRIER

BACKGROUND OF THE INVENTION

1. Field of the Invention

This invention is for an umbrella type collapsible stroller frame which is adapted to carry a removable infant seat of nonspecific dimensions. The infant seat can function in any of the many separate roles for safety type seats in the course of child care including use as a car seat, a feeding seat, a napping chair, etc. The collapsible stroller frame is comprised in part of a sling and straps which serve the purpose of allowing virtually any shape or any size infant seat or carrier to fit in the stroller frame. These sling and strap elements also serve the purpose of absorbing shocks as the stroller moves along the ground, thus preventing the infant from being disturbed.

2. Description of the Prior Art

Infant strollers have, of course, been in existence a long time. Over the years, there have been a number of innovations with respect to combinations of seats and stroller frames, particularly to make them easier to transport; as parents find out when they have children that a large amount of equipment is necessarily transported on each outing from the home.

U.S. Pat. No. 2,574,743 (King) is for a child perambulator and auto seat. This invention is for an older child, is rigidly constructed, and must be disassembled to be collapsed.

U.S. Pat. No. 3,208,763 (Boyd) relates to an infant type seat and carriage whereby the infant seat may be removably mounted and the carriage collapsed when the infant seat is removed. This device folds flat. However, owing to the unalterable arrangement of frame tubes, the Boyd frame can only accommodate the particular infant seat for which it was designed. In a similar concept, in U.S. Pat. No. 3,550,998 (Boudreau) the body and running gear of the carriage are arranged so that when the carriage is folded, the carriage components including the rigid seat nest into a somewhat compact package.

U.S. Pat. No. 4,685,688 (Edwards) is for a combination seat for use as a stroller and a safety car seat for children. The combination seat has telescoping legs with wheels and pivotable telescoping handles which may be extended to function as a stroller or retracted and pivoted to become a child safety car seat.

U.S. Pat. No. 4,768,795 (Mar) is for a baby stroller comprising a seat portion and a frame portion separable from the seat portion. The stroller seat comprises a concave front portion forming a seat and a pair of opposite retaining walls. A flexible safety belt serving both as a fastener and as a shock absorber is provided on the stroller seat. The stroller frame is collapsible and can be folded into a compact volume when not in use. Again, however, owing to the unalterable configuration of the frame tubes, the collapsible frame in Mar can only accommodate the specified and associated seat.

SUMMARY OF THE INVENTION

The present invention relates to an umbrella type collapsible stroller frame which is especially adapted for carrying an infant type seat. This present invention has a forwardly located sling support element which in combination with a relatively rearwardly located strap element support a variety of shapes and sizes of infant type seats. The sling element accommodates a leading edge portion of the infant seat which can be of any shape or size so as only to fit within the frame rails of the expanded and erect stroller. Similarly, the rearward portion of the infant seat is placed onto the strap element which spans between the frame rails. The infant seat may be secured to the stroller frame by use of additional straps or belt elements as desired.

In this manner, the infant seat can be detachably removed from the infant carriage and used as a infant car seat, feeding chair, etc. The only functional requirement for the infant seat to be used with the collapsing frame is that the seat dimensionally fit between the frame rails.

The collapsible frame of this invention is comprised of a pair of longitudinal frame elements connected one to the other by scissor braces so that the longitudinal frame elements may collapse towards one another. The longitudinal frame elements have first and second ends. The first end is comprised of handles for manipulating the frame and pushing the stroller, and the second end which is opposite the first end is comprised of roller elements, such as wheels. The frame, when in an erect condition, defines a forward portion and a rearward portion.

The longitudinal frame elements are additionally connected by at least one rearwardly located strap element, and a forwardly located support element. The support element is comprised of at least one sling element which in combination with the strap element is adapted to support an infant seat. The sling element is adapted to receive a leading edge portion of the carried infant seat. The support element may or may not be additionally comprised of a front bar spanning between forwardly projecting support bars attached to the longitudinal frame elements. The sling may be comprised of a cloth, mesh, flexible plastic, or other suitable readily deformable material for receiving and shock insulating a forward edge of an infant seat. Necessarily, if the longitudinal elements are to collapse one to the other, the support bar may also include either a hinge or complementary telescoping members to facilitate collapse of the element along with the remainder of the frame. Otherwise, the tension of the sling's fabric pulled between the longitudinal frame elements may provide enough support for the forward edge of an infant seat, similar in concept to the tension in a hammock or director's chair.

The strap elements connecting between the frame elements are necessarily adjustable, or at least stretchable, so as to accommodate the various shapes and sizes of infant seats. The adjustability may be provided with a buckle or clasp type fastener, or may be a fabric or snap fastener. If an operative adjustability is not provided between separate portions of the strap, an elastic flexibility may be provided in the material of the strap. The strap also functions to shock isolate the infant seat from the frame elements and rails.

Additionally, the longitudinal frame elements of the stroller may be telescopically collapsible lengthwise, in addition to being foldable.

The stroller may be further comprised of those elements commonly found on a stroller, including a brake locking system on some or all of the wheels, single or dual wheels on each of the legs of the stroller, and a sun shade. The only guide in adding additional features being that each feature is necessarily carried when the stroller is in a collapsed condition, and only adds to the bulk and weight of the stroller frame.

DETAILED DESCRIPTION OF THE PREFERRED EMBODIMENTS

Figure 1:
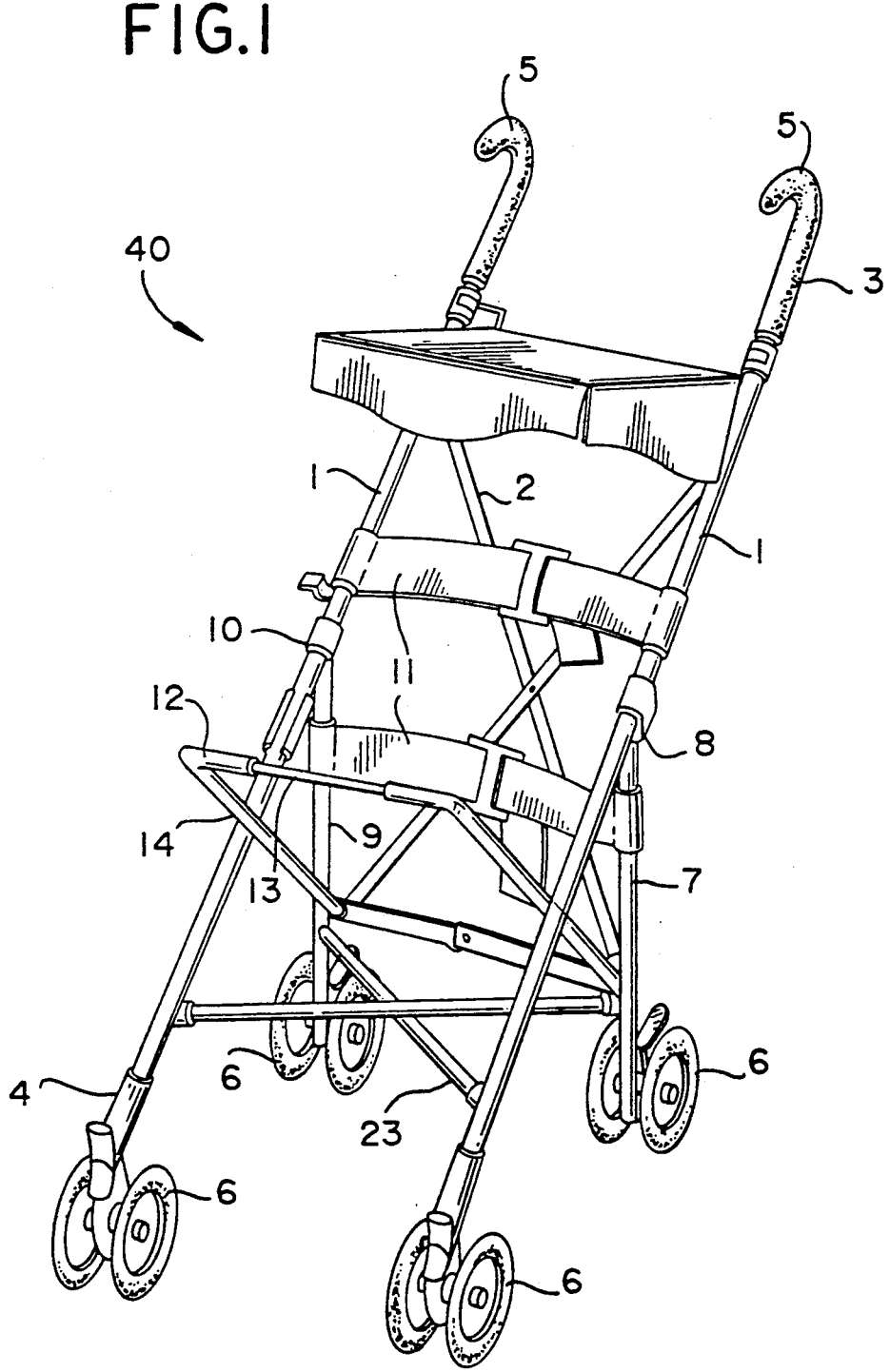
FIG. 1 is a perspective view of the infant carriage without the infant seat and forward sling.
Figure 2:
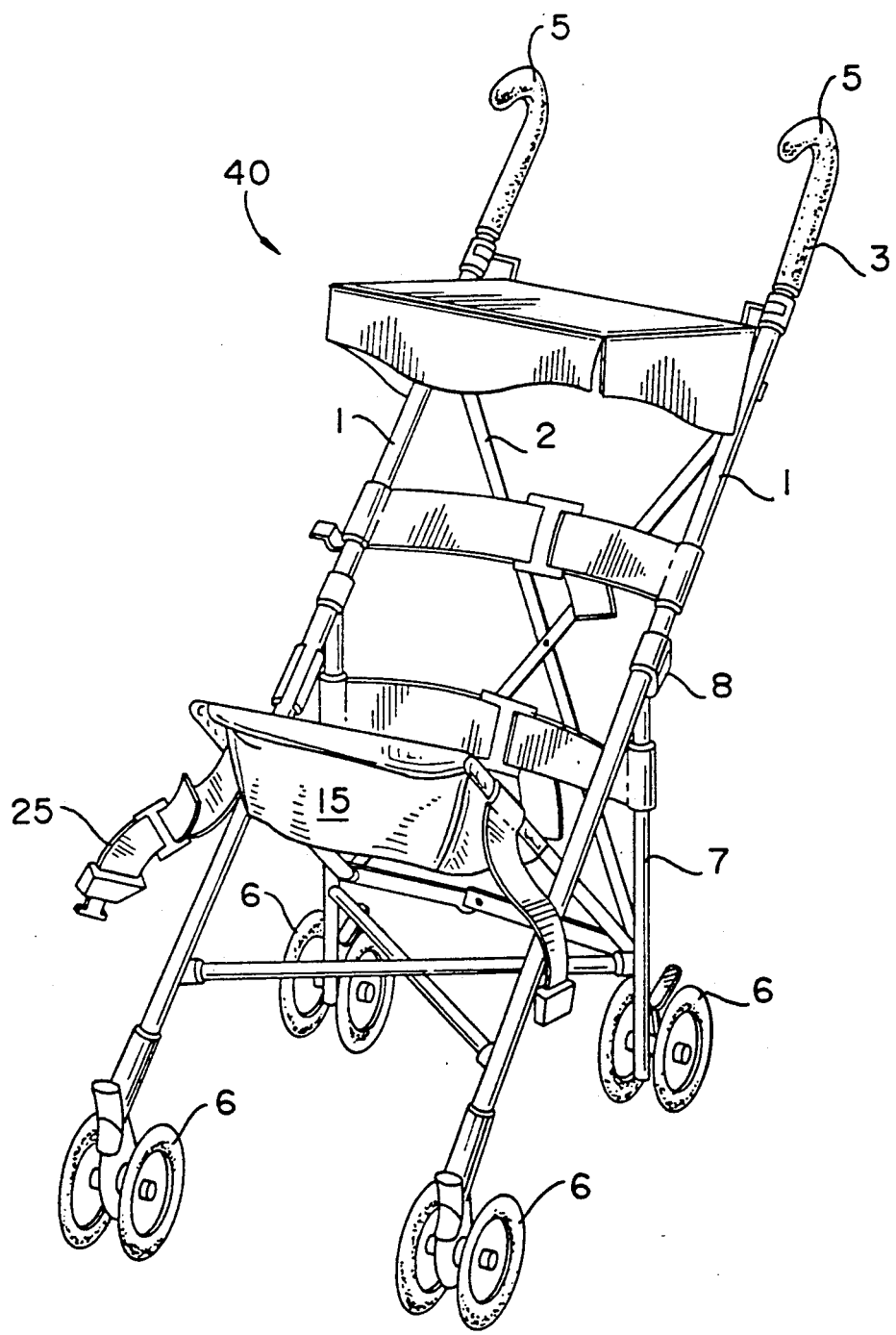
FIG. 2 is a perspective view of the infant carriage with the forward sling but without the infant seat and with the alternative "seat belt".
Figure 3:
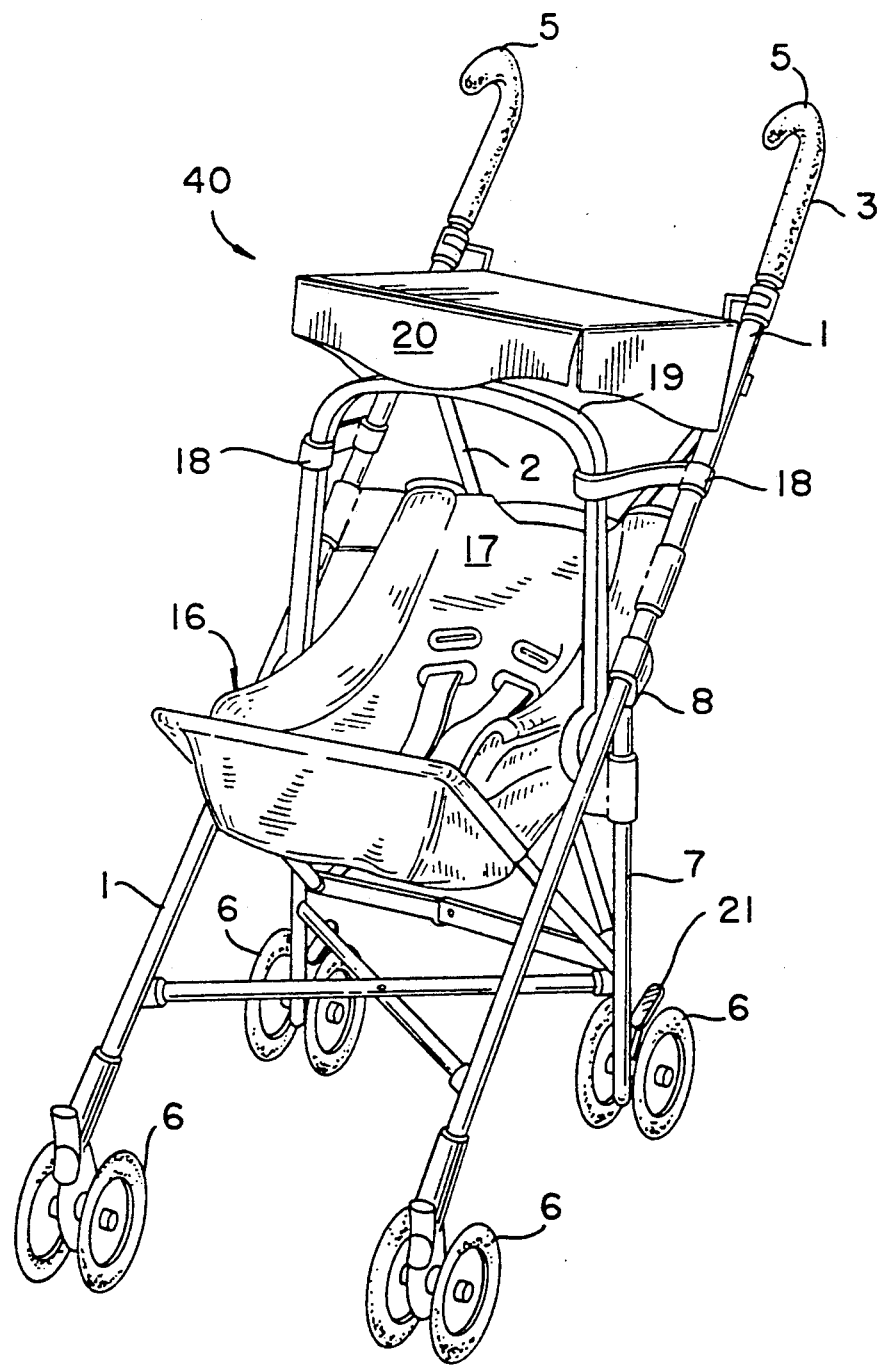
FIG. 3 is a perspective view of the stroller frame with an infant seat in position.
Figure 4:
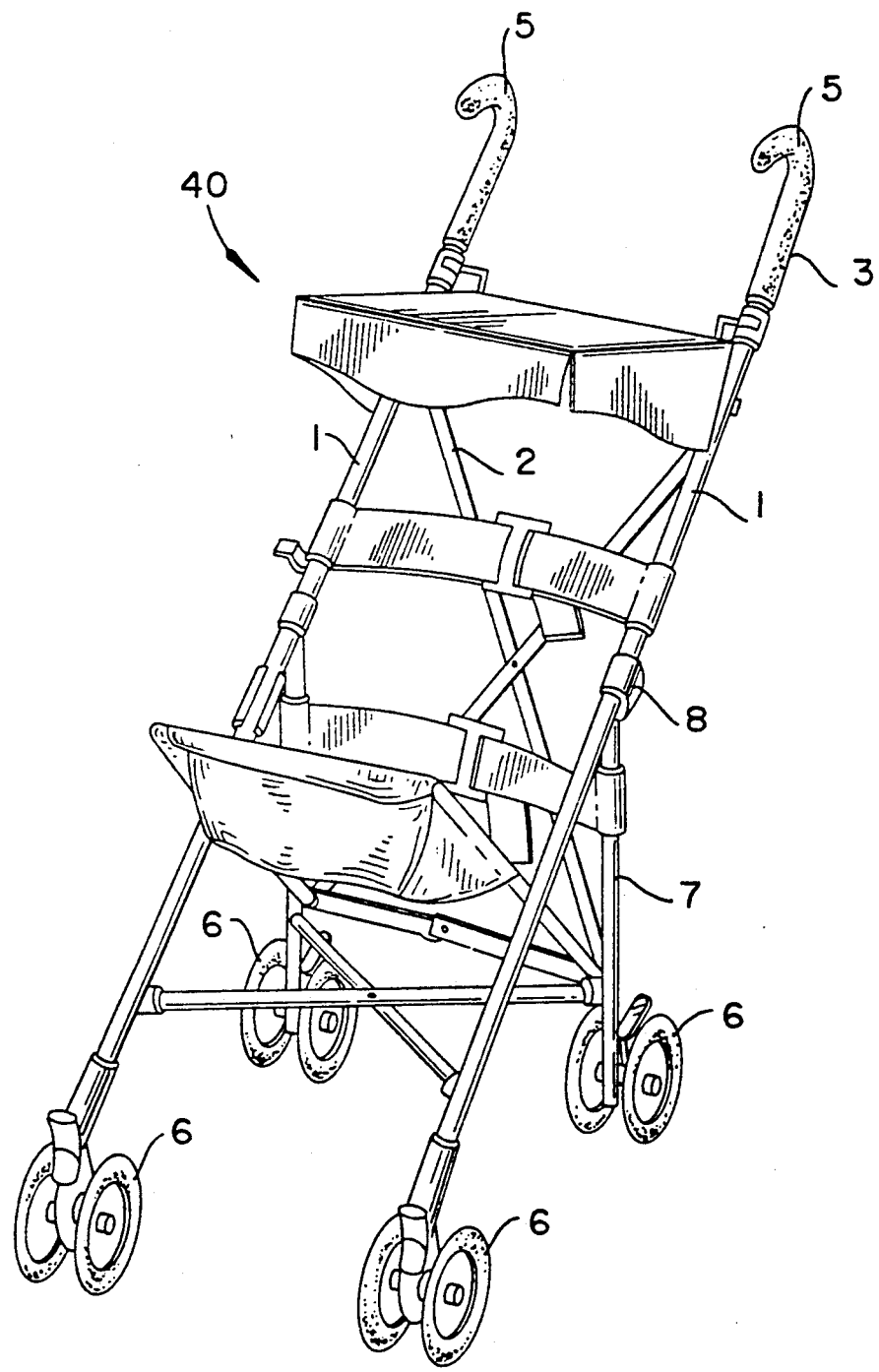
FIG. 4 is a perspective view of the stroller frame showing the front sling in suspended form without an underlying support element.

FIGS. 1, 2, and 4 show the basic frame of the stroller 40. The collapsible longitudinal frame elements 1 are connected to each other by scissor braces 2 so that the longitudinal frame elements may collapse towards one another. The longitudinal frame elements 1 have first ends 3 and second ends 4. The first ends 3 of the longitudinal frame elements 1 have umbrella type handles 5 and the second ends 4 opposite the first ends 3 of the longitudinal frame elements have wheels 6 attached thereto. A first intersecting support element 7 at one end thereof s diagonally intersects and connects to one of the longitudinal frame elements 1 between the first 3 and second ends 4 of the longitudinal frame element 1. (For descriptive purposes the longitudinal elements are considered to include the long frame elements 1 and the intersecting supports (7 and 9) attached along the midpoint of these elements.) A second intersecting support element 9 diagonally intersects and connects at one end thereof 10 to the other longitudinal frame element 1 in the same manner. A second set of scissor braces 23 diagonally connects the lower leg portions of the intersecting support elements 7 and 9 with a forward leg portion of the respective longitudinal frame elements 1.

The longitudinal elements 1 are additionally connected by at least one strap element 11, and a forwardly located support element 12. The support element 12 may be comprised of a front bar 13 which in turn is supported by side bars 14 which are attached to either the intersecting support elements 7, the longitudinal frame elements 1, or both. A sling 15 is attached to and supported by the support elements 14 (and 13 if so equipped). The sling may accommodate the front bar within the fabric, and may be attached to the front bar 13 and/or side bars 14 by rivets, adhesive, or other fastening means. The sling 15 may be comprised of a strong durable cloth, mesh, plastic, or other readily deformable material.

In use, the forward edge of the infant seat 16 rests in this sling, while the back 17 of the infant seat 16 is supported by at least one, and preferably two strap elements Or back straps 11. Each of the strap elements 11 traverse the longitudinal frame elements 1 and can be adjustably related by a buckle or clasp. Alternatively, the strap may be formed of a stretchable cloth which adapts to the shape of the carried infant seat.

Buckle straps 18 are also included for additional securement of the seat to the frame. These straps may be comprised of cloth, nylon, leather or plastic and are attached at one end to the longitudinal frame elements and can be attached at the other end to the handle 19 or body portion of the infant seat 16. A "seat belt" 15 is provided on the longitudinal frame elements for infant seats that are not equipped with an overhead handle but do have slits intended for such a "seat belt".

The stroller can also be equipped with a sun shade 21, a brake system 21, and dual wheels 6 on each of the legs of the stroller.

Owing to the configuration of the present frame and strap/sling combination, a variety of various manufacturers "infant" type care seats may be accommodated. The similar characteristic of the various infant seats are that they support an infant in a relatively reclined position. As such, they each have a leading edge and back portion in similar relative proximity owing to the desire to fit as range of infant shapes and sizes. Each seat has specific characteristics which slightly alter the basic seat such as the inclusion of pockets to contain small toys, pacifiers, extra diapers, etc. These dimensional variations are accommodated in the present frame by the strap and sling combination. As such, most infant seats, from sturdy car seat to slight table top seat, are carried in the frame of the present invention in a shock insulated manner.

The preferred embodiment of the invention has been herein described. However, the description is not intended to limit the scope of the invention since the invention may be practiced in other embodiments without departing from the spirit of the invention. Accordingly, the scope of the invention is intended to be limited only by the scope of the appended claims.

What is claimed is:

1. A collapsible stroller frame adapted for carrying an infant seat, said frame comprising:

a pair of collapsible longitudinal frame elements connected one to the other by collapsible brace elements, said longitudinal elements being movable one towards the other between a first erect position and a second collapsed position, said longitudinal elements having first and second ends, a first end thereof comprising handles for manipulating said frame, said second ends comprising roller elements for traversing said frame over ground, said frame when in an erect condition defining a forward and a rearward portion thereof, said longitudinal elements being additionally interconnected by at least one strap element in a rearward portion of said frame, and interconnected in a forward portion of said frame by a support element, said support element comprising sling means secured to said support element independent of and spaced from said strap element, to accept a forward portion of an infant seat, so that, when an infant seat is placed onto said frame, a forward portion of said seat is supported by said sling means and a rearward portion of said seat is supported by said strap element.

2. A stroller frame as in claim 1, wherein:
said strap element is adjustable in length.

3. A stroller type frame as in claim 1, wherein:
said strap element is comprised of a deformable material adapted to accommodate the shape of a rearward portion of a carried infant seat.

4. A stroller type frame as in claim 1, further comprising:
securing means attached to said frame for securing said infant seat to said frame.

5. A stroller type frame as in claim 1, further comprising:

a plurality of strap elements connecting between said longitudinal frame elements.

6. A stroller frame as in claim 1, wherein:
said sling means comprises a flexible mesh.

7. A stroller frame as in claim 1, wherein:
said sling means comprises a fabric pouch.

8. A stroller frame as in claim 1, wherein:
said support element further comprises a collapsible bar element spanning between said longitudinal frame elements.

* * * * *